United States Patent Office 3,407,039
Patented Oct. 22, 1968

3,407,039
OXIDATION OF HYDROGEN CHLORIDE ON COPPER EXCHANGED MORDENITE
Douglas E. Bryant, Barre, Mass., assignor to Norton Company, Worcester, Mass., a corporation of Massachusetts
No Drawing. Filed Dec. 17, 1965, Ser. No. 514,656
1 Claim. (Cl. 23—219)

ABSTRACT OF THE DISCLOSURE

Copper exchanged mordenite for the Deacon reaction ($4HCl+O_2 \rightarrow 2Cl_2+2H_2O$) or for chlorination of hydrocarbons is employed up to 800° C. to avoid loss of copper catalyst by volatilization. Exchange of 30% or more of cation sites on Na or H mordenite disclosed as effective.

---

This invention relates to a new catalyst and catalytic process for the oxidation of hydrogen chloride. The catalyst is a cupric ion exchanged form of mordenite. The process involves the reaction between hydrogen chloride and oxygen at elevated temperature in the presence of the catalyst.

The gaseous phase oxidation of HCl in the presence of a catalyst is known as the Deacon process. The conventional catalyst in this process is a cupric salt impregnated on an inert catalyst carrier such as alumina. One of the problems associated with the use of this catalyst is the fact that the copper salt volatilizes at the reaction temperatures resulting in a gradual loss in activity. One proposed remedy for this problem is shown in U.S. Patent No. 2,547,928 which discloses a method of maintaining the activity of the catalyst by recovering cupric chloride, which is vaporized from it into the exit gases from the reaction zone, by condensing a portion of the exit gases and forming an aqueous hydrochloric acid solution containing absorbed cupric chloride and returning that solution onto the surface of the catalyst in the reaction zone.

The present invention is applicable to fixed bed or fluidized bed reactors and does not require the collection and continuous addition of volatilized catalyst to the bed since at the reaction temperatures employed no significant volatilization of copper occurs from the copper exchanged mordenite.

One method previously employed to reduce catalyst volatilization has been the use of a diluent material mixed with the catalyst carrier to avoid hot spots in the bed. As evidence of the stability of the catalyst of the present invention copper exchanged mordenite has been run at 485° C. without inert diluent for 66 hours with evidence of only a trace of copper volatilization.

The catalyst of the present invention is easily prepared from natural and synthetic mordenites by conventional ion exchange techniques well known in the art. The activity of the catalyst naturally is influenced by the amount of copper exchanged. I have found that as little as 30% exchange, that is 30% of the exchangeable sites of the zeolite being satisfied by one positive charge from a cupric ion shared with a second exchange site produces a satisfactory catalyst. This is equivalent to about a 1% by weight copper content on a dry basis. The copper may be exchanged on a metal form of mordenite such as sodium mordenite, ammonium mordenite, or hydrogen mordenite.

The raw materials for this process consist of hydrogen chloride and oxygen. It is conventional to supply the oxygen in the form of air. Thus, the oxygen fed to the catalyst of this invention may be diluted with inert materials such as nitrogen. In addition, a third raw material to be subjected to chlorination from the chlorine produced in the catalytic reaction may be added to the feed. For example, a hydrocarbon to be chlorinated may be fed to the reactor along with the hydrogen chloride and air or oxygen. The reactor and auxiliary apparatus employed in the examples tabulated below consists of the following:

A glass reactor 60 centimeters long by 23 millimeters inside diameter with thermocouples attached at suitable intervals was mounted vertically in an aluminum core temperature-controlled tube furnace. The reactants were passed through suitable flow controllers, rotameters, mixing and preheat sections and down through the reactor. The catalyst charge was supported by glass wool. The effluent vapors were passed through a fritted glass bubbler containing 500 ml. of 0.5 m. potassium iodide solution. A second bubbler containing potassium iodide solution and a few drops of starch indicator solution was placed in series with the first to detect any chlorine which did not absorb and react. The amount of iodine formed in the first bubbler was determined by tritration with $\frac{1}{10}$ normal sodium thiosulfate solution. In all runs described the quantity of oxygen employed was approximately 10% in excess of that required by stoichiometric considerations by suitably adjusting the flow rates.

For use in fixed bed applications bonded mordenite pellets are employed. Bonded natural or synthetic mordenite are equally useful in this application. I have found that the mordenite pellets disclosed in British Patent 979,398 published Apr. 21, 1965, are particularly convenient to use. Equally satisfactory, however, are pellets made from natural or synthetic mordenite powder cemented together by an acid resistant bond, for use in fluidized bed applications, mordenite powders, either natural or synthetic of appropriate particle size for fluidization are employed.

In the following examples, catalyst S is a sodium mordenite, in pellet form, 54% copper (cupric) exchanged. Catalyst A is ammonium mordenite, in pellet form, 67% copper (cupric) exchanged. Catalyst H is hydrogen mordenite, in pellet form, 38% exchanged with cupric ions.

In the case of catalyst A a silicon carbide granular diluent was employed as follows: in the top of 7.5 cm. of the catalyst bed a homogeneous mixture of 10 ml. of catalyst A and 20 ml. of silicon carbide was employed; in the middle 10 m., a mixture of 20 ml. of A and 15 ml. of silicon carbide was employed; and in the bottom 11 cm. a mixture of 30 ml. of A and 10 ml. of silicon carbide was employed. As indicated in U.S. Patent No. 3,184,515, various inert diluent materials may be employed. Because of the stability of my catalyst, however, such diluents are not necessary in the present invention, as shown by the results tabulated below.

| Example | Catalyst | HCl, ml./min | T.° C. | Percent conversion |
|---|---|---|---|---|
| 1 | S(80g.) | 210 | 365 | 5.1 |
| 2 | S(80g.) | 230 | 486 | 52.8 |
| 3 | S(80g.) | 220 | 406 | 10.1 |
| 4 | S(80g.) | 120 | 454 | 39.6 |
| 5 | A(53g.) | 210 | 405 | 3.5 |
| 6 | A(53g.) | 180 | 452 | 11.1 |
| 7 | A(53g.) | 215 | 459 | 12.8 |
| 8 | A(53g.) | 110 | 461 | 16.4 |
| 9 | A(53g.) | 200 | 377 | 2.7 |
| 10 | H(80g.) | 105 | 467 | 21.0 |
| 11 | H(80g.) | 175 | 468 | 19.4 |
| 12 | H(80g.) | 180 | 485 | 27.2 |
| 13 | H(80g.) | 190 | 484 | 27.0 |
| 14 | H(80g.) | 205 | 485 | 27.6 |

Example 13 was made after catalyst H was exposed to the conditions of Example 12 for 66 hours. The results show that no catalyst deactivation occurred in this time period.

Example 14 was made with a modification of catalyst H in which the catalyst was impregnated with 6% by weight of $CuCl_2$. No significant increase in activity resulted from the additional copper content.

X-ray diffraction patterns of used catalyst from the above examples indicated no significant loss of crystallinity of the used mordenite catalyst base.

At around 300° C. the rate of reaction is too low to be of significant commercial utility. At above about 800° C., the mordenite begins to lose its crystallinity in the presence of hydrogen chloride and water vapor. Thus the temperature at which the described process should be carried out is between 300 and 800° C., with the preferred range being 325 to 500° C.

What is claimed is:

1. In the process for oxidizing hydrogen chloride in the presence of oxygen to form free chlorine, at elevated temperatures between 300° C. and 800° C., by exposure to a copper including catalysts, the improvement consisting of employing mordenite having copper present at ion exchange sites to the extent of at least 1% by weight.

References Cited

UNITED STATES PATENTS

| 2,783,286 | 2/1957 | Reynolds | 23—219 XR |
| 2,882,244 | 4/1959 | Milton | 23—112 XR |
| 3,033,641 | 5/1962 | Thomas | 23—112 XR |
| 3,033,642 | 5/1962 | Bukata et al. | 23—112 XR |
| 3,094,383 | 6/1963 | Dzierzanowski et al. | 23—112 |
| 3,159,455 | 12/1964 | Skaperdas et al. | 23—219 XR |
| 3,173,759 | 3/1965 | Williams | 23—112 |
| 3,323,876 | 6/1967 | Arey et al. | 23—112 XR |

FOREIGN PATENTS 941,349  11/1963  Great Britain.

OTHER REFERENCES

Nature, vol. 164, July 16, 1949, pages 112 and 113.

J. Chem. Soc., 1948, pages 2158–2163.

OSCAR R. VERTIZ, *Primary Examiner.*

EDWARD STERN, *Assistant Examiner.*